2,879,643

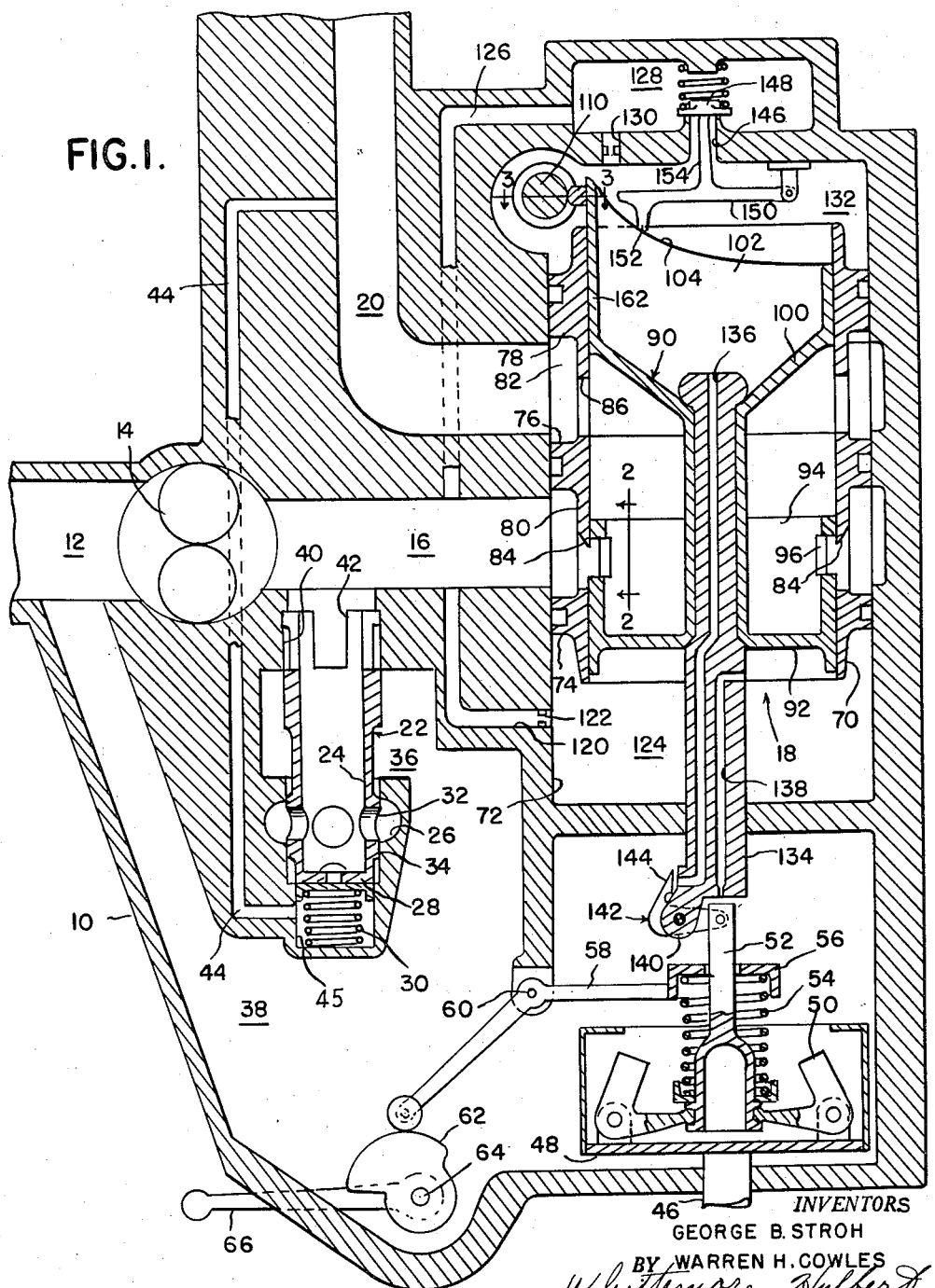

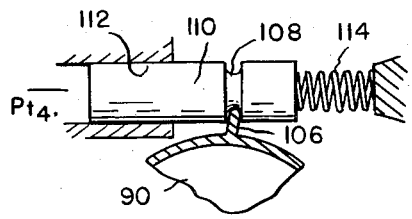
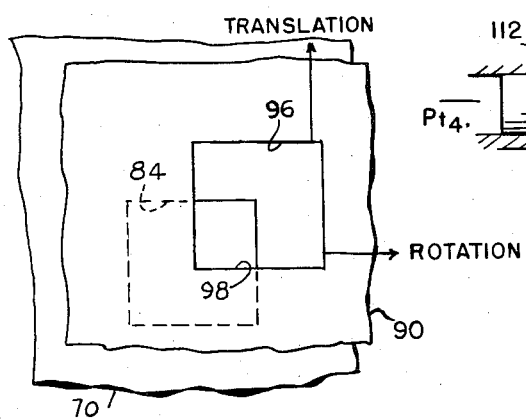
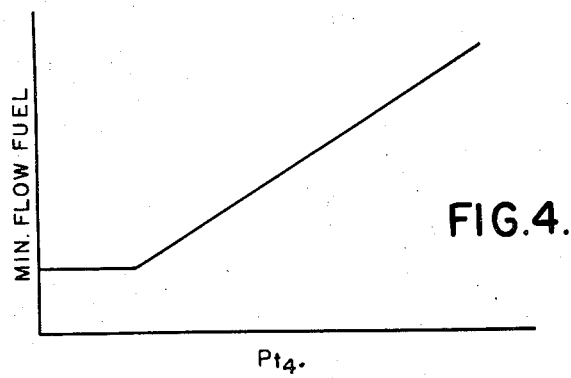
FIG.4.
INVENTORS
GEORGE B. STROH
WARREN H. COWLES
BY
ATTORNEYS United States Patent Office 2,879,643
Patented Mar. 31, 1959

ENGINE FUEL REGULATING SYSTEM IN-
CLUDING AUTOMATIC MINIMUM FLOW
ADJUSTMENT

George B. Stroh, St. Clair Shores, and Warren H. Cowles, Detroit, Mich., assignors to Holley Carburetor Company, Van Dyke, Mich., a corporation of Michigan Application June 4, 1956, Serial No. 589,115

16 Claims. (Cl. 60—39.28)

The present invention relates to a fuel regulating system for an engine, and more particularly to a fuel regulator designed to provide a predetermined minimum flow of fuel during deceleration.

In automatic speed regulated fuel supply systems, when manual adjustment is made to the speed regulating mechanism calling for abrupt deceleration, the system tends to reduce the fuel flow below a safe minimum value. In accordance with the present invention a minimum fuel flow is provided which may be a function of any selected variable such for example as pressure, speed, or the like.

It is an object of the present invention to provide in an automatic speed responsive fuel supply system for an engine, minimum fuel flow regulating means operable to maintain a predetermined minimum fuel flow under conditions when engine speed remains in excess of that called for the speed responsive mechanism.

More specifically, it is an object of the present invention to provide means responsive to a variable condition for providing a predetermined but variable minimum flow of fuel to a normally speed regulated engine during deceleration.

It is a feature of the present invention to provide a fuel regulating system including a cylindrical fuel valve movable axially and rotatable in a valve cylinder having a port therein, means responsive to a first variable for shifting the valve axially of the cylinder, and means responsive to a second variable for rotating the valve in the cylinder.

It is a further feature of the present invention to provide a system as described in the preceding paragraph in combination with means responsive to the instantaneous rotational position of the valve for limiting axial movement thereof.

It is a further feature of the present invention to provide in a system as described in the foregoing, cooperating shaped valve ports or openings in the wall of the cylinder and in the piston valve, the overlapping area of which determines the valve opening for fuel flow.

Other objects and features of the invention will become apparent as the description proceeds, especially when taken in conjunction with the accompanying drawings, wherein:

Figure 1 is a diagrammatic sectional view of the apparatus embodying the fuel regulating system.

Figure 2 is an enlarged developed diagrammatic view taken on the line 2—2, Figure 1.

Figure 3 is a fragmentary sectional view on the line 3—3, Figure 1.

Figure 4 is a diagram showing the relationship between minimum fuel flow and a variable engine condition.

The invention as illustrated herein is intended for use with a jet or turbine engine employing an air compressor for supplying primary combustion air to a combustion chamber and a fuel pump for supplying fuel to the combustion chamber. Automatic means are provided for regulating the supply of fuel to the engine in accordance with a first variable condition. As illustrated herein, this variable condition is engine speed and means are provided for controlling a valve opening in accordance with engine speed. Additional means are provided for maintaining the pressure drop across the valve constant so that the rate of flow of fuel to the engine is dependent solely on valve opening and not upon a variable pressure drop across the opening.

In a fuel control system of this type, manually adjustable means are provided for setting the speed responsive control and when this manual means is moved to a position calling for substantial deceleration, the automatic fuel supply control means tends to cut off the supply of fuel, or at least to reduce it below a safe operating minimum.

In general terms, the present invention provides means for limiting the amount by which the speed responsive means can reduce the flow of fuel to the engine. This means is responsive to a second variable as for example air compressor outlet pressure, and the degree of closure of the fuel supply valve is automatically variable to produce desired results.

The mechanism as described in general terms above is shown as disposed in a housing 10 having a fuel inlet passage 12 leading to a fuel pump indicated generally at 14 from which fuel flows through a passage 16, through the valve means indicated generally at 18, through a passage 20 leading to the combustion chamber of the engine.

Means are provided for maintaining a substantially constant pressure drop across the valve means 18 and this comprises a pressure regulating valve 22 movable in a cylindrical recess 24 provided with an annular radially enlarged chamber 26. The valve has a closed end portion 28 against which a compression spring 30 bears to bias the valve upwardly, as seen in Figure 1. The valve is provided with ports 32 communicating with the annular chamber 26 and extending through a radially outwardly extending continuous annular portion 34 which fits within the cylindrical recess 24. With the parts in the position illustrated in Figure 1 it will be observed that the upper edge of the portion 34 is at the upper edge of the annular chamber 26 so that further downward movement of the valve 22 will permit escape of fluid from the chamber 26 into a chamber 36 communicating with low pressure existing at the interior of the housing in the space indicated generally at 38. The open end of the valve 22 is movable in a cylindrical portion 40 of the housing and is recessed as indicated at 42. The recesses are closed by the cylindrical wall 40 in the position shown but permit escape of fluid from the fuel supply passage 16 to the low pressure portion of the housing upon downward movement of the valve 22.

It will be observed that the pressure of fuel delivered by the fuel pump 14 tends to move the valve 22 downwardly against compression spring 30. A passage 44 communicates with the passage 20 which connects valve 18 to the combustion chamber, and extends to a chamber 45 wherein fuel under pressure existing in the passage 20 operates against the closed end of the valve 22 tending to move it upwardly. The valve 22 normally floats in a slightly open position and is thus effective to provide close regulation of pressure differential between fuel passages 16 and 20.

Means responsive to engine speed are provided for regulating the opening of the valve 18 and this means comprises a shaft 46 connected to a rotating part of the engine and provided with a plate 48 on which are mounted centrifugal elements 50 adapted as a result of centrifugal force to apply forces to the shaft 52 tending to move the shaft upwardly. Movement of the shaft 52 upwardly is opposed by a governor spring 54 having an adjustable spring seat 56 carried by a bell crank lever 58 pivoted as indicated at 60. The position of the bell crank lever 58 is controlled by a cam 62 mounted on a shaft 64 which extends out of the housing 10 and connects to an operating lever 66. It will be observed that for any given setting of the governor spring 54 the shaft 52 tends to assume a definite position dependent solely upon engine speed.

The fuel valve indicated at 18 comprises a cylindrical fitting 70 received in a generally cylindrical chamber 72 in the housing. The fitting 70 is provided with annular ribs 74, 76 and 78. Between the ribs 74 and 76 there is provided an annular chamber 80 which communicates with the fuel passage 14. Between the ribs 76 and 78 there is provided an annular chamber 82 which communicates with the fuel delivery passage 20.

The cylindrical fitting 70 is provided with one or more inlet valve ports 84 which as best seen in Figure 2, may be of rectangular shape in development. Also, provided in the cylindrical fitting 70 are one or more enlarged fuel outlet ports 86. A movable valve member indicated generally at 90 is provided in the fitting 70. The valve member 90 comprises an end closure 92 connected to a cylindrical valving portion 94 having one or more valve openings 96 cooperating with the valve ports 84. As best seen in Figure 2, the openings 96 may be rectangular in shape and adapted to partially overlie the valve ports 84 to define therewith a valved opening indicated at 98.

The opposite end of the valve member 90 includes an end closure 100 having a cylindrical skirt portion 102, the edge of which is contoured as indicated at 104 for a purpose which will presently appear. In addition, the cylindrical portion 102 extends outwardly beyond the rib 78 and is there provided with a tooth or finger 106 (Figure 3) which is received within a groove or tooth space 108 formed in a longitudinally movable pressure responsive plunger 110. It will be appreciated that if the contour of the camming surface 104 is such as to require substantial rotation of the valve 90, the valve may be provided with a plurality of teeth 106 and the plunger 110 may be provided with a plurality of grooves, recesses or tooth spaces 108, thus in effect becoming a rack. The plunger 110 is movable in a cylinder 112 and its movement in the cylinder is opposed by a compression spring indicated diagrammatically at 114. The end of the plunger within the cylinder 112 is subjected to a variable pressure dependent upon an engine function such for example as outlet pressure from the air compressor, this pressure being designated $Pt_4$ in Figure 3.

Servo mechanism is provided for effecting movement of the piston 90 and for this purpose the fuel supply passage 16 is connected through a passage 120 provided with a restriction 122 to a chamber 124 at the lower end of the piston type valve 90. At the same time a passage 126 leads from the fuel supply passage 14 to a chamber 128 within the housing and thence through a restricted passage 130 to the chamber 132 at the upper end of the valve 90. Thus, fluid under substantial pressure is provided at opposite ends of the piston. In order to provide for movement of the valve 90, the valve is provided with a stem 134 having a passage 136 extending therethrough and communicating with the chamber 132. The passage 136 opens laterally of the stem 134 within the low pressure portion 38 of the housing. A second passage 138 is provided in the stem 134, opening into the chamber 124 and extending to the end of the stem as shown. The end of the stem has an extension 140 to which is pivoted a bell crank 142 having a valve portion 144 normally spaced slightly from the outlet port at the outer end of the passage 136. The shaft 52 has its end portion pivotally connected to the bell crank 140 and the end wall of the shaft is normally spaced slightly from the port provided by the outer end of the passage 138. If the end of the shaft 52 and the valve portion 144 provide equal restrictions to the escape of fluid under pressure through passages 138 and 136 respectively, the piston valve 90 is maintained in stationary position. If however, the shaft 52 is moved in either direction by the speed responsive means it has the effect of simultaneously closing the outlet port or one of the passages 136 and 138 and correspondingly opening the outlet port of the other passage. This immediately results in differential pressure building up within the chambers 124 and 132 and will cause the piston valve 90 to follow the shaft 52. The operation is equivalent to a servo mechanism and relieves the speed responsive mechanism from any appreciable load in shifting the fuel valve 90.

The end of the cylindrical chamber 132 in the housing 10 is provided with a passage 146 leading to the chamber 128 and normally closed by a spring pressed check valve 148. Pivoted within the chamber 132 is a lever 150 having a cam follower portion 152 engageable with the contoured end wall of the valve 90 and having a valve operating finger 154 engageable with the check valve 148. With the parts in the position illustrated in the figure, it will be observed that the cam follower portion 152 is engaging the contoured surface 104 and the finger 154 is engaging check valve 148. Accordingly, if the governor shaft 52 moves upwardly tending to produce corresponding movement of the valve 90 upwardly, such movement of the valve opens check valve 48 and admits pressure into the chamber 132 upwardly of the valve 90. Since the passage of fluid under pressure under these conditions is unrestricted, it will be apparent that fluid pressure within the chamber 124 cannot be built up to exceed that in the chamber 132 and accordingly, the mechanism just described operates as means effective to limit valve closing movement of the valve 90. It will further be apparent that the position in which valve closing movement is limited is dependent upon the rotational position of the valve as determined by the plunger 110.

With the foregoing description of the mechanism in mind, the operation is believed to be readily apparent. When the speed setting lever 66 is moved by the pilot to a position calling for deceleration of the engine, the cam 62 permits the lever 58 to decrease the force of the governor spring 54. Under these conditions and before a change in speed of the engine takes place, the centrifugal elements 50 move outwardly, pushing the governor shaft 52 upwardly. This action tends to produce equivalent movement of the valve 90 upwardly. This condition is illustrated in Figure 2 where it will be observed that movement of the valve 90 upwardly will result in a reduction of area of the valve opening 98 and thus a reduction in the flow of fuel to the engine. This reduction in the flow of fuel results in deceleration to a value determined by the new setting of the governor spring 54.

During minimum flow of fuel, the centrifugal elements 50 of the governor urge the fuel valve 90 axially of the cylinder toward closed position until the minimum flow contour surface 104 on the end of the fuel valve contacts the lever 150. Additional upward movement of the valve opens the minimum fuel check valve 148 against its spring, thereby admitting sufficient high pressure fluid from the chamber 128 to prevent further upward movement of the valve 90. The cylindrical rack 110 operates to rotate the fuel valve 90 proportionally with engine compressor dicharge pressure $Pt_4$. As the rack slides in its cylinder it engages the tooth 106 on the fuel valve and rotates it. Hence, the rotational opening of the fuel valve is at all times a function of compressor outlet pressure $Pt_4$.

When the manual speed setting lever 66 is in a position calling for deceleration, the centrifugal elements 50 have moved outwardly, and the fuel valve 90 will have moved upwardly to a position determined by engagement with the lever 150. The engine now begins to decelerate. As this happens, compressor discharge pressure also decreases. This allows the compressor rack 110 to rotate the fuel valve 90 in a direction tending to produce closure of the opening 98 by rotational movement of the valve. At first the contour surface 104 of the valve is shaped with zero rise so that the position of the lever 150 does not change with rotation of the valve and the axial position of the valve is thus held constant. This allows the fuel to decrease linearly with compressor outlet pressure $Pt_4$ since the valve 90 is being closed solely by rotation. At a predetermined value of compressor outlet pressure $Pt_4$, the contoured surface of the valve rises, thus opening check valve 148 and resulting in downward movement of the fuel valve in accordance with cam rise. The cam rise is preferably selected so as to cause the amount of valve opening due to axial movement of the valve to approximately equal the amount of valve closure as a result of continued valve rotation, thereby maintaining a substantially constant metering area and therefore a substantial constant fuel flow. This is desirable at the lower values of engine compressor discharge pressure. Thus, the relationship between compressor outlet pressure $Pt_4$ and minimum fuel flow is maintained. This last relationship is illustrated diagrammatically in Figure 4 where values of minimum fuel flow have been plotted against values of compressor outlet pressure $Pt_4$.

The drawings and the foregoing specification constitute a description of the improved fuel regulating system in such full, clear, concise and exact terms as to enable any person skilled in the art to practice the invention, the scope of which is indicated by the appended claims.

What we claim as our invention is:

1. Fuel control valve means for an internal combustion engine comprising a cylindrical valve chamber having a fuel inlet port therein, a cylindrical valve movable axially and angularly in said chamber, a valving port in said valve cooperable with the port in said chamber to vary the valve opening by rotation and/or translation of said valve, means responsive to engine speed to move said valve axially in translation, and additional means responsive to a different condition for moving said valve angularly in rotation and for simultaneously limiting axial translation of said valve beyond a point variably determined by said variable condition.

2. Means for limiting minimum fuel flow to an engine comprising fuel valve means comprising a cylindrical valve chamber having a port therein, a fuel valve movable axially and rotatable in said chamber, said valve having means cooperable with said port to limit fuel flow in accordance with the axial position of said valve, and means for limiting movement of said valve axially in valve closing direction to provide a minimum fuel flow, said last means comprising means for rotating said valve in said chamber.

3. Means for limiting minimum fuel flow to an engine comprising fuel valve means comprising a cylindrical valve chamber having a port therein, a fuel valve movable axially and rotatable in said chamber, said valve having means cooperable with said port to limit fuel flow in accordance with the axial position of said valve, means for limiting movement of said valve axially in valve closing direction to provide a minimum fuel flow, said last means comprising means for rotating said valve in said chamber, and a contoured control surface at one end of said valve.

4. Fuel control means for an engine comprising a cylindrical chamber having a port, a cylindrical valve movable axially and rotatable in said chamber, said valve having means cooperable with said port to restrict flow of fuel therethrough, manually adjustable speed responsive means connected to said valve for moving said valve axially, said valve having a contoured abutment surface at one end, means including a part engageable with said surface for limiting movement of said valve toward closed position by said speed responsive means, and means responsive to a second variable engine condition for rotating said valve.

5. Fuel control means for an engine comprising a cylindrical chamber having a port, a cylindrical valve movable axially and rotatable in said chamber, said valve having a port cooperable with said first mentioned port to vary flow of fuel therethrough as a result of axial movement and/or rotation of said valve, manually adjustable speed responsive means connected to said valve for moving said valve axially, said valve having a contoured abutment surface at one end, means including a part engageable with said surface for limiting movement of said valve toward closed position by said speed responsive means, and means responsive to a second variable engine condition for rotating said valve.

6. Fuel control means for an engine having an air compressor comprising a cylindrical chamber having a port, a cylindrical valve movable axially and rotatable in said chamber, said valve having a port cooperable with said first mentioned port to vary flow of fuel therethrough as a result of axial movement and/or rotation of said valve, manually adjustable speed responsive means connected to said valve for moving said valve axially, said valve having a contoured abutment surface at one end, means including a part engageable with said surface for limiting movement of said valve toward closed position by said speed responsive means, and means responsive to compressor outlet pressure for rotating said valve.

7. Fuel supply means for an engine comprising a valve cylinder having inlet and outlet ports, a fuel pump for supplying fuel under pressure to said inlet port, a fuel valve movable axially and rotatable in said cylinder and having means for variably restricting one of said ports as a result of axial movement and/or rotation and affording communication between said ports, restricted means for admitting fuel to opposite ends of said cylinder, means responsive to engine speed for variably restricting flow out of the ends of said cylinder to effect axial movement of said valve, said cylinder having at the end thereof toward which said valve moves to close said port an open, comparatively unrestricted passage for supplying fuel from said fuel pump to said last mentioned cylinder end, a check valve for said passage, and means operable by axial movement of said fuel valve to open said check valve to arrest further closing movement of said fuel valve.

8. Fuel supply means for an engine comprising a valve cylinder having inlet and outlet ports, a fuel pump for supplying fuel under pressure to said inlet port, a fuel valve movable axially and rotatable in said cylinder and having means for variably restricting one of said ports as a result of axial movement and/or rotation and affording communication between said ports, restricted means for admitting fuel to opposite ends of said cylinder, means responsive to engine speed for variably restricting flow out of the ends of said cylinder to effect axial movement of said valve, said cylinder having at the end thereof toward which said valve moves to close said port an open, comparatively unrestricted passage for supplying fuel from said fuel pump to said last mentioned cylinder end, a check valve for said passage, means operable by axial movement of said fuel valve to open said check valve to arrest further closing movement of said fuel valve, said last means comprising a contoured abutment surface on said fuel valve effective to open said check valve at different positions of axial advance of said fuel valve dependent on its angular position, and means responsive to a variable engine condition for rotating said fuel valve.

9. Fuel supply means for an engine having an air compressor comprising a valve cylinder having inlet and outlet ports, a fuel pump for supplying fuel under pressure to said inlet port, a fuel valve movable axially and rotatable in said cylinder and having means for variably restricting one of said ports as a result of axial movement and/or rotation and affording communication between said ports, restricted means for admitting fuel to opposite ends of said cylinder, means responsive to engine speed for variably restricting flow out of the ends of said cylinder to effect axial movement of said valve, said cylinder having at the end thereof toward which said valve moves to close said port an open, comparatively unrestricted passage for supplying fuel from said fuel pump to said last mentioned cylinder end, a check valve for said passage, means operable by axial movement of said fuel valve to open said check valve to arrest further closing movement of said fuel valve, said last means comprising a contoured abutment surface on said fuel valve effective to open said check valve at different positions of axial advance of said fuel valve dependent on its angular position, and means responsive to air compressor outlet pressure for rotating said fuel valve.

10. Fuel supply means for an engine comprising a valve cylinder having inlet and outlet ports, a fuel pump for supplying fuel under pressure to said inlet port, a fuel valve movable axially and rotatable in said cylinder and having means for variably restricting one of said ports as a result of axial movement and/or rotation and affording communication between said ports, speed responsive means for moving said fuel valve axially, and means responsive to a second variable engine condition for rotating said valve and for limiting axial movement thereof beyond a variable point determined by the variable engine condition.

11. Fuel supply means for an engine having an air compressor comprising a valve cylinder having inlet and outlet ports, a fuel pump for supplying fuel under pressure to said inlet port, a fuel valve movable axially and rotatable in said cylinder and having means for variably restricting one of said ports as a result of axial movement and/or rotation and affording communication between said ports, speed responsive means for moving said fuel valve axially, and means responsive to compressor outlet pressure for rotating said valve and for limiting axial movement thereof beyond a variable point determined by compressor outlet pressure.

12. Fuel supply means for an engine having an air compressor comprising a valve cylinder having inlet and outlet ports, a fuel pump for supplying fuel under pressure to said inlet port, a fuel valve movable axially and rotatable in said cylinder and having a port for variably restricting one of said ports as a result of axial movement and/or rotation, and affording communication between the ports of said cylinder, speed responsive means for moving said valve axially, means responsive to compressor outlet pressure for rotating said valve, said valve having a contoured end surface, means engaging said surface to limit axial movement of said valve in valve closing direction, said contoured surface including a dwell portion with no axial component to provide variation to fuel flow which responds linearly to variations in compressor outlet pressure and a rise portion to thereafter provide axial movement to cancel out the effect of further rotational movement to maintain fuel flow constant.

13. A fuel regulating system for an engine comprising a valve including a valve cylinder having a port therein, a valve member movable axially and rotatable in said cylinder, said valve member having an opening adapted to partially overlap said port, means responsive to a first variable condition for moving said valve member axially of said cylinder, means responsive to a second variable condition for rotating said valve member in said cylinder, and means responsive to the instantaneous rotational position of said valve member for limiting axial movement thereof in a direction tending to close said valve beyond a point determined by the value of said second variable condition.

14. Means for limiting minimum flow of fuel to an engine comprising fuel valve means including a cylinder having a valve port, a piston movable axially of said cylinder by fluid pressure in said cylinder and including a valving portion cooperable with said port to control the flow of fuel through said port in accordance with the axial position of said piston, speed responsive means for controlling fluid pressure within said cylinder to move said piston axially in said cylinder, means responsive to an engine condition other than speed for rotating said piston in said cylinder, cam means movable angularly with said piston, and valve means operable by said cam means at an engine speed determined by said other engine condition effective to prevent further axial movement of said piston by fluid pressure controlled by engine speed.

15. Structure as defined in claim 14 in which said port and valving portion are shaped to vary the valve opening as a result of angular movement of said piston.

16. Structure as defined in claim 14 which comprises manual means for shifting said piston mechanically.

References Cited in the file of this patent

UNITED STATES PATENTS

| | | |
|---|---|---|
| 2,422,808 | Stokes | June 24, 1947 |
| 2,674,847 | Davies et al. | Apr. 13, 1954 |

FOREIGN PATENTS

| | | |
|---|---|---|
| 614,202 | Great Britain | Dec. 10, 1948 |
| 744,013 | Great Britain | Jan. 25, 1956 |